United States Patent
Gal-On et al.

(10) Patent No.: US 9,582,473 B1
(45) Date of Patent: Feb. 28, 2017

(54) INSTRUCTION SET TO ENABLE EFFICIENT IMPLEMENTATION OF FIXED POINT FAST FOURIER TRANSFORM (FFT) ALGORITHMS

(71) Applicant: Cadence Design Systems, Inc., San Jose, CA (US)

(72) Inventors: Shay Gal-On, Mountain View, CA (US); Vologymyr Arbatov, Sunnyvale, CA (US); Christopher Rowen, Santa Cruz, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 254 days.

(21) Appl. No.: 14/267,789

(22) Filed: May 1, 2014

(51) Int. Cl.
*G06F 17/14* (2006.01)
(52) U.S. Cl.
CPC .................................. *G06F 17/142* (2013.01)
(58) Field of Classification Search
None
See application file for complete search history.

(56) References Cited

U.S. PATENT DOCUMENTS

| | | | | |
|---|---|---|---|---|
| 5,042,000 A | * | 8/1991 | Baldwin | G06F 17/142 708/404 |
| 5,440,749 A | * | 8/1995 | Moore | G06F 7/5272 711/E12.02 |
| 6,263,420 B1 | * | 7/2001 | Tan | G06F 9/30029 708/209 |
| 2002/0053015 A1 | * | 5/2002 | Tan | G06F 9/30029 712/42 |
| 2005/0283589 A1 | * | 12/2005 | Matsuo | G06F 9/30101 712/217 |

* cited by examiner

*Primary Examiner* — David H Malzahn
(74) *Attorney, Agent, or Firm* — Schwegman Lundberg & Woessner, P.A.

(57) ABSTRACT

A computer implemented method and system for providing a Fast Fourier Transform (FFT) capability to a fixed point processor architecture is disclosed. In a first aspect the computer implemented method and system comprises providing an instruction set within the fixed point architecture. The instruction set includes a plurality of instructions to calculate at least one set of add operations within a FFT butterfly. The plurality of instructions are controlled by a mode register, wherein a plurality of vector register files and a scratch state memory provide input data to at the at least one set of add operations.

14 Claims, 8 Drawing Sheets

INSTRUCTION SET TO ENABLE EFFICIENT IMPLEMENTATION OF FIXED POINT FAST FOURIER TRANSFORM (FFT) ALGORITHMS

FIELD OF THE INVENTION

The present application relates generally to processing systems and more particularly to a system and method for implementing Fast Fourier Transform (FFT) algorithms in such systems.

BACKGROUND

Fast Fourier Transform (FFT) algorithms require moving data in non sequential manner from arrays and to arrays. In addition the operations also form long data dependent chains. As a result using vector operations in FFT algorithms incurs a high cost in underlying hardware implementation.

Fixed point operations for such algorithms have a lower cost in hardware, but reduce the expected precision of the output. Hence, what is desired are systems and methods that address the above identified issues when implementing an FFT algorithm. The present invention addresses such a need.

SUMMARY

A computer implemented method and system for providing a Fast Fourier Transform (FFT) capability to a fixed point processor architecture is disclosed. In a first aspect the computer implemented method and system comprises providing an instruction set within the fixed point architecture. The instruction set includes a plurality of instructions to calculate at least one set of add operations within a FFT butterfly. The plurality of instructions are controlled by a mode register, wherein a plurality of vector register files and a scratch state memory provide input data to at the at least one set of add operations.

In an embodiment, a small set of instructions are disclosed that can be used to implement an efficient fixed point FFT algorithm for any FFT problem size with different radix sizes. The instructions implement some parts of FFT related operations in hardware. In addition to the fast operation, the instructions also use dynamic scaling to increase the accuracy of the result versus fixed scaling without incurring a performance overhead.

DETAILED DESCRIPTION

The present application relates generally to processing systems and more particularly to a system and method for implementing Fast Fourier Transform (FFT) algorithms in such systems. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In a system and method in accordance with an embodiment, a small set of instructions can be used to implement an efficient FFT algorithm for any FFT problem size with operations using fixed point arithmetic. The instructions implement some parts of FFT related operations in hardware. In addition to the FFT operation, the instructions also use dynamic scaling to increase the accuracy of the result versus fixed scaling without incurring a performance overhead.

To describe these different features in more detail refer now to following discussion in conjunction with the accompanying figures.

Baseline Fixed Point Architecture

A baseline fixed point architecture is needed to provide an instruction set for Fast Fourier transform (FFT) operations. The basic fixed point architecture operates in conjunction with an underlying vector/VLIW architecture which includes the following classes of operations.

1. Vector data register file, including A entries, each S*N bits wide, where S is a typically a power-of-two. In one reference embodiment, S=32 and N=16 bits 1. Alignment buffers register file, including E entries, each has same bits width as vector register file entry.

2. A wide accumulator register file, including B entries, each S*W bits wide. In one reference embodiment, W=40 bits.

3. A shift/select register file, including C entries, each S*V bits wide. In one reference embodiment, V=7 bits.

4. An address/scalar register file, including D entries, each R bits wide. In a one reference embodiment, R=32 bits.

5. A scalar operation set including memory operations, arithmetic, shift, logical and branch/jump/call operations the use the address/scalar register file.

6. A set of vector load and store operations that generate an address, often using one or more entries from the address register file, load or store a vector of S*N bits to or from the vector data register file, perhaps updating the address register file.

7. A set of data reorganization operations that can reorder the elements of one or more data vectors, controlled by either a fixed pattern or one controlled by the elements of a shift/select register file entry, or move data between among the various register files.

8. A set of fixed point computation operations that do add, subtract, comparison, multiply, divide and other arithmetic operations, shift operations, using immediate shift amount, or per element amount from a shift/select register file and logical operations.

Figure 1:
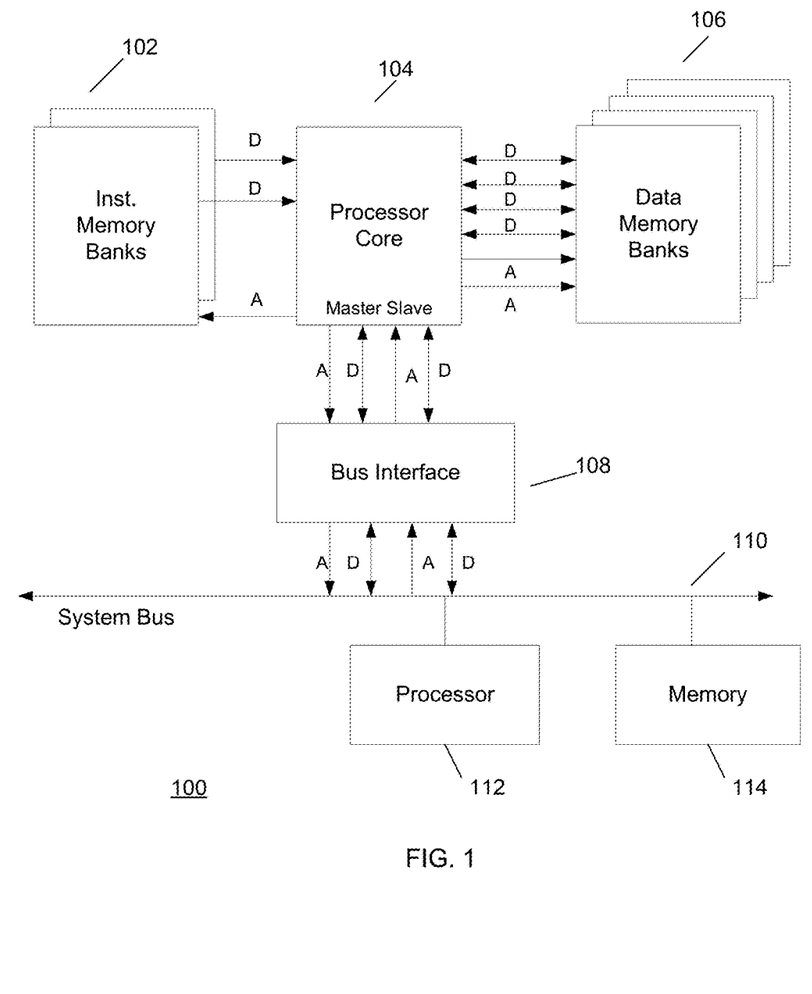
FIG. 1 is a block diagram of a fixed point processing system in accordance with the present invention.

FIG. 1 is a block diagram of a processing system 100 in accordance with the present invention. The processing system 100 includes a processor core 104 which receives data and addresses from a plurality of instruction memory banks 102 and a plurality of data memory banks 106. The processor core 104 exchanges address and data signals with the bus interface 108. The bus interfaces 108 exchanges address and data signals over a bus 110 with for example an external processor 112 and memory 114.

Figure 2:
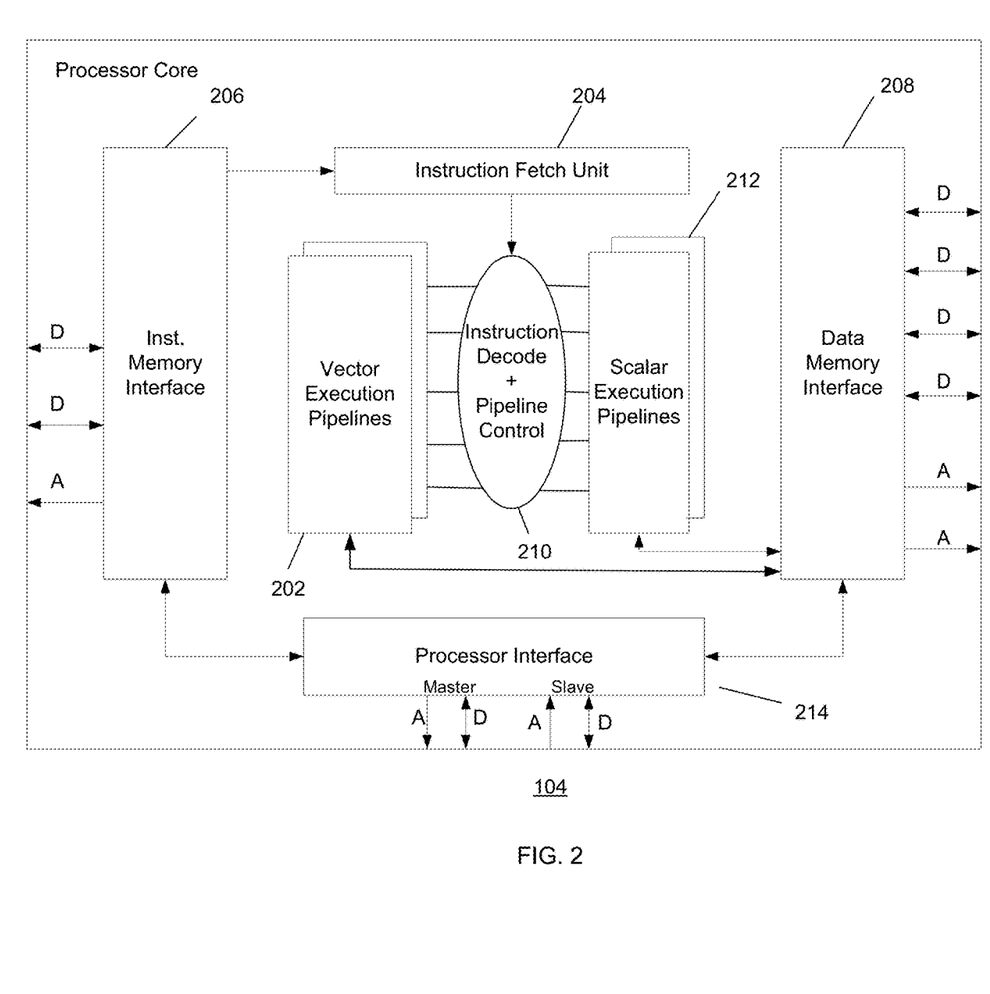
FIG. 2 is a block diagram of an embodiment of a processor core of the processing system of FIG. 1.

FIG. 2 is a block diagram of an embodiment of a processor core 104 of the processing system of FIG. 1. The processor core 104 includes an instruction memory interface 206 which is in communication with the plurality of instruction memory banks 102 (FIG. 1) and a data memory interface 208 that is in communication with the plurality of data memory data banks 106 (FIG. 1). Both memory interfaces 206 and 208 are coupled to the processor interface 214.

An instruction fetch unit 204 receives instructions from instruction memory interface 206. The instruction fetch unit 204 provides the instructions to instruction decode and pipeline control 210. The instruction decode and pipeline control 210 is coupled to a plurality of vector execution pipelines 202 and a plurality of scalar execution pipelines 212. The data memory interface 208 exchanges data with both the plurality of vector execution pipelines 202 and the plurality of scalar execution pipelines 212.

In a system and method in accordance with an embodiment, floating point operations share most of the register files, execution units and pipeline structures with common fixed-point architecture features in a same digital signal processor (DSP), allowing the processor core 104 to execute FFT operations with high throughput and low hardware cost. The key FFT operations are typically implemented as a short sequence of more primitive operations, often scheduled in different operation issue slots within a VLIW architecture, to enable parallel execution.

Figure 3A:
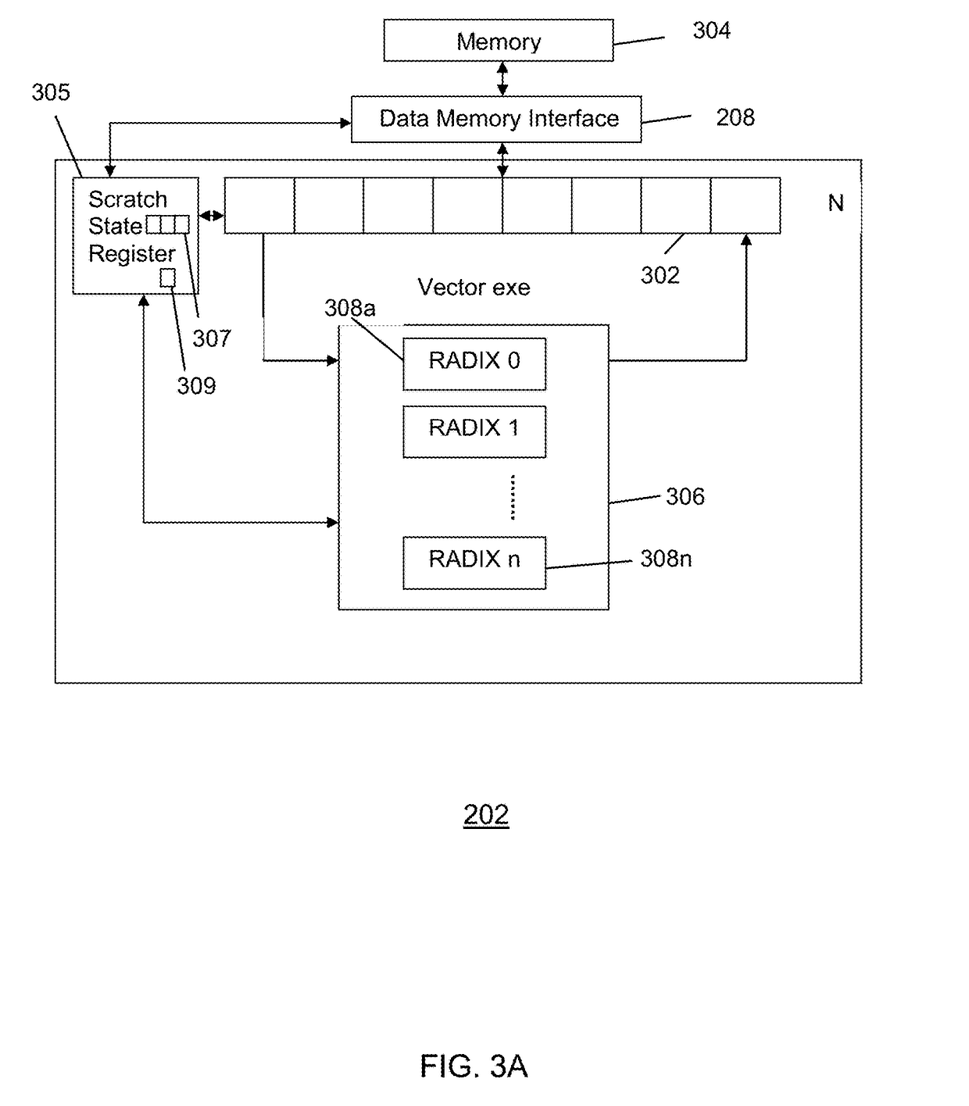
FIG. 3A illustrates a portion of a vector execution pipeline while computing an FFT algorithm in accordance with an embodiment.

FIG. 3A illustrates a portion of a vector execution pipeline 202 while computing an FFT algorithm in accordance with an embodiment. As is seen, the portion of the vector execution pipeline 202 includes a vector register file 302 that includes a plurality of registers. The plurality of registers of the vector register file receives and sends data to a memory 304 via the data memory interface unit 208. In an embodiment the data memory interface unit 208 comprises a load/store unit. The vector execution pipeline 202 also includes a vector execution unit 306 that includes a plurality of vector operations 308a-308n that implements the FFT algorithm. The vector operations 308a-308n receive data from and provides data to the vector register files 302. In an embodiment, a scratch state 305 is coupled to the vector register files 302, the vector execution unit 306 and the data memory interface 208.

Data can also be loaded to or stored from the scratch state 305 as needed from the memory 304 or the vector register file 302. The scratch memory location 305 is a register that does not require the ports that are needed to transfer data in the vector registers and can be addressed in any manner. Therefore the transfer is less costly. The scratch state 305 is a register in which information is stored in a manner that is utilized to provide special operations. The scratch state 305 includes four states (A,B,C,D) that can be utilized to provide input data for the vector add operations. The scratch state includes other state registers for controlling operations within the instruction set. These state registers include BBE_MODE register 307 and BBE_RANGE register 309. In an embodiment, these registers set FFT control bits for scaling and radix-4 additions and set control bits to indicate a current range of the data output from an FFT operation or stage, respectively.

Through the use of the scratch state 305 and an instruction set, FFT operations can be implemented with low cost hardware. Additionally, the amount of time taken to execute the FFT algorithm is significantly reduced. Finally, the instruction set provides for an improved dynamic tracking of range within an FFT algorithm to minimize saturation of the data being processed without affecting performance. To describe the features of the present invention in more detail refer now to the following discussion in conjunction with the accompanying Figures.

Figure 3B:
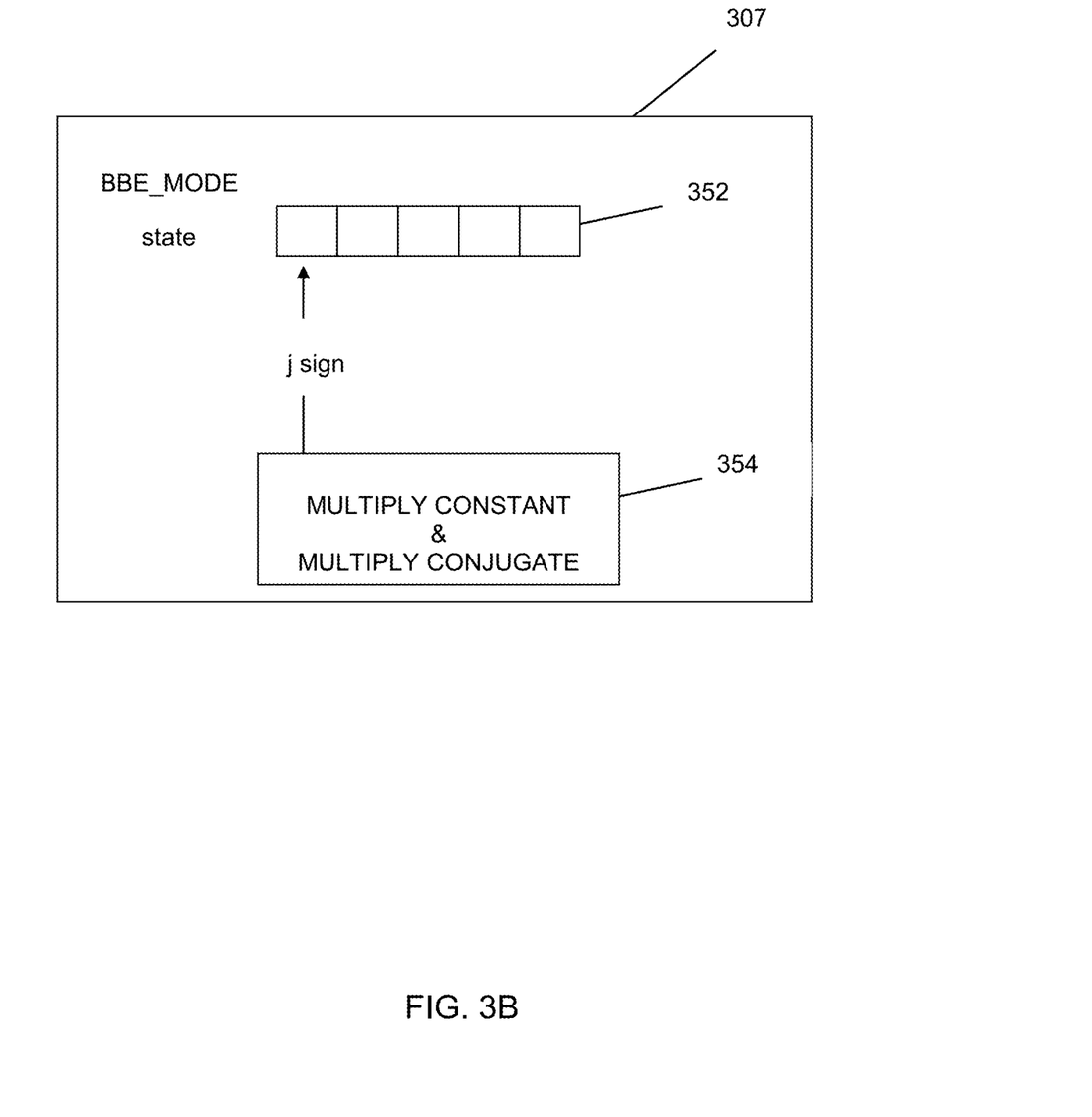
FIG. 3B illustrates the BBE_MODE register in accordance with an embodiment.

FIG. 3B illustrates the BBE_MODE register 307 in accordance with an embodiment. In an embodiment, BBE_MODE register 307 in an embodiment is a 5-bit control register. It contains the mode bit 354 that controls a complex multiplication operation: whether multiplication is a regular complex multiplication or if one of two arguments is conjugated before complex multiplication is performed. The mode bit 354 also controls a sign of j in radix 4 operations. The rest of the BBE_MODE register 307 specifies right shift amounts for the vector operations.

Referring each to FIG. 3A, for example, BBE_MODE[4] bit may specify a sign of j in the vector operations. BBE_MODE[3:2], BBE_MODE[1:0] specify right shift amount for BBE_FFTADD4S{AB,CD}NX16 operations. BBE_FFTSRANX16 operation uses BBE_MODE[3:2] as a shift amount. BBE_FFTADDSSRNX16/BBE_FFTSUBSSRNX16 operations use BBE_MODE[0] as shift amount. Other operations will be discussed in more detail later in this specification.

FFT Helper Operations and States

Below are examples of helper operations and states that are utilized with the instruction set. The types of helper state and operations include machine state registers, load state registers, move state registers, move into align register, select operations, store with interleaving and range update, and range operations. Examples of these helper operation and states are shown below with an example instruction name for each as well as a description of the function of each.

| Type | Name | Description |
|---|---|---|
| Machine state registers | BBE_STATE{A, B, C, D}<br>BBE_MODE<br>BBE_RANGE | To load FFT data.<br>To set FFT control bits for scaling and radix-4 additions.<br>To indicate the current range of data. |
| Load state registers | BBE_LV{A, B, C, D}_{IP,XP} | Load states post-increment update from immediate or address register. |
| Move state registers | BBE_MOVS{A, B, C, D}V<br>BBE_MOVVS{A, B, C, D} | Move vector register to state, or state to vector register. |
| Move into align register | BBE_MOVUVR | Move vector register to align register with BBE RANGE update |
| Select operation | BBE_DSELNX16I | Double select operation. Interleave elements of two vector registers into two output registers. |
| Store with interleaving and range update | BBE_SVINTLARNX16_XP,<br>BBE_SALIGNVRNX16_XP<br>BBE_SVRNX16_{XP, IP}<br>BBE_SAVRNX16_XP | Various interleave and (aligning) store operations with update of BBE_RANGE register. Data from vector or align registers. |
| Range operations | BBE_RANGENX16<br>BBE_RRANGE/BBE_WRANGE | Compute range on input vector<br>Read/write BBE_RANGE register. |

BBE Vector Radix-4 FFT Butterfly Operation

Figure 4:
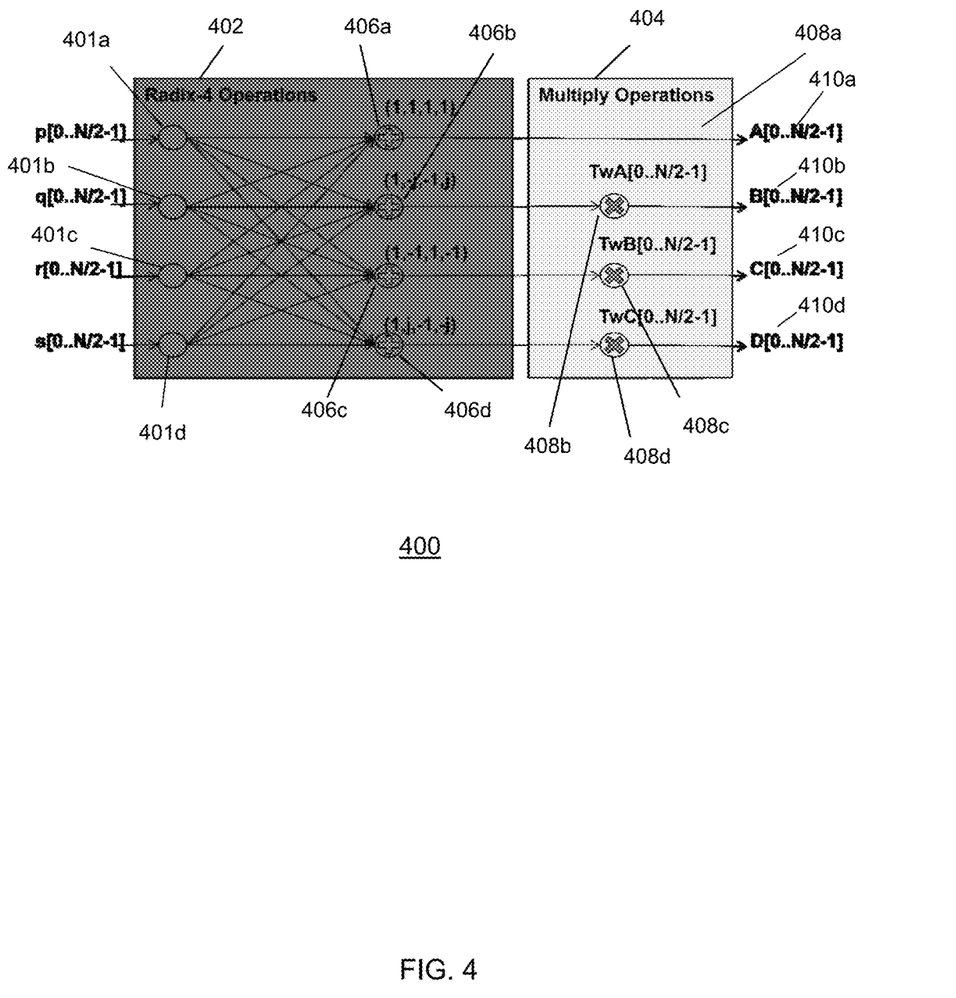
FIG. 4 is a block diagram of the Radix 4 FFT operation in accordance with an embodiment.

A system and method in accordance with the present invention utilizes a Radix-4 butterfly as its core computation model with input vectors of multiple complex elements and separate operations for additions/subtractions and for multiplies. FIG. 4 is a block diagram of the Radix 4 FFT Butterfly 400. In the context of a FFT algorithm, a butterfly is a portion of the computation that combines the results of smaller discrete Fourier transforms (DFTs) into a larger DFT, or vice versa (breaking a larger DFT up into subtransforms). In this embodiment, the Radix 4 FFT Butterfly 400 includes Radix 4 operations module 402 and multiply operations module 404. The Radix 4 operations module 402 includes four legs. Each leg includes a load instruction 401a-401d, multiply add instruction 406a-406d, a multiply instruction 408a-408d and a store instruction 410a-410d. It is desirable to perform all of the instructions in each leg of the Radix butterfly 400 during steady state operation in one cycle. The multiply operations module 404 include conventional multiply by twiddle factors 408a-408d.

In an embodiment, the load instructions 401a-401d provide four inputs to the multiply add instruction 406a. The multiply add instruction 406a: a) takes the outputs of load instruction 401a-401d; b) multiplies input values by constant and conjugate values (1, j, −1 and −j); where the constant and conjugate values utilized are controlled by an instruction "mode"; and c) produces one output by adding results of the multiplication from step (b). To implement the multiply add operation using a conventional floating point arithmetic unit would be relatively costly in efficiency and cost.

Accordingly a system and method in accordance with an embodiment utilizes the fact that an output value from the multiply add instruction 406 can only change by multiplication of the constants or conjugates 1, −1, or j or −j with the inputs and provides instructions from the instruction set to improve the efficiency of implementing the multiply add operation.

In an embodiment the instruction set includes two add/subtract instructions that are utilized to implement the multiply add instructions 406a-406d shown in FIG. 4. In this embodiment, two of the inputs to the multiply add instructions 406a-406d come from the scratch state register 305 rather than from the vector registers to allow the operations to occur in one cycle. Examples of the Radix 4 operations are shown below.

| | |
|---|---|
| BBE_FFTADD4SABNX16 | Compute radix-4 butterflies SIMD-wise with shift right controlled |
| BBE_FFTADD4SCDNX16 | by BBE MODE state. Input comes from two vector registers and two states; rotation factor index from immediate output is a vector register. |

As before mentioned, it is desirable to perform all of the vector operations in the Radix butterfly during steady state operation, such as load data, scale, multiply by constant, add four elements multiply by twiddle factor, and store data all in one cycle. Many processors cannot perform all of these vector operations in a single cycle due to design constraints. A key feature of an embodiment is that instead of loading all four data values from the vector registers, two of the inputs can come from registers and two inputs can come from scratch state memory allowing all above mentioned operations to be executed in one cycle.

As mentioned above, the BBE_MODE register is utilized to control the Radix 4 vector operations. In an example, BBE_MODE[4] bit may specify a sign of j in radix-4 vector operations. BBE_MODE[3:2] and BBE_MODE[1:0] may specify a right shift amount for the BBE_FFTADD4S{AB, CD}NX16 vector operations to support dynamic scaling.

Operations Used to Enable Efficient Implementation of Vector Operations Other than Radix 4 Vector Operations There are variations of vector operations other than Radix 4 vector operations are needed to implement other radix kernels efficiently. These variations are desired to reduce latency, facilitate dynamic scaling and/or reduce code size.

Examples instructions to implement these special variations of vector operations are shown and described below.

| | |
|---|---|
| BBE_FFTADDSSRNX16 | Add and subtract with dynamic scaling controlled by BBE_MODE. |
| BBE_FFTSUBSSRNX16 | Used to implement radix 2 butterfly. Also used in radix 8 and radix 5 kernels in combination with radix 4. |
| BBE_FFTAVGNX16SB | Averages two input vectors with rounding and places output into BBE_STATEB. Used in radix-3 kernels in combination with radix 4 operation. |
| BBE_FFTSRANX16 | Shift vector register right according to BBE_MODE settings. Used in radix 5. |
| BBE_FFTMULNX16PACKQ | Compute multiplication of two input vector registers with an option to conjugate one of the vectors. Facilitates multiplication by twiddles in either FFT or IFFT direction. Note: Internally uses native machine multiplies. |
| BBE_FFTRMODE | Read/write BBE_MODE control register. |
| BBE_FFTWMODE | |
| DFT matrix factorization example | |

Various FFT algorithms can utilize the instruction set described in the present specification to achieve higher performance. In the example below, the decimation in frequency Stockham algorithm is illustrated.

The following notation is utilized to describe the FFT algorithm. The Fourier transform matrix of order N is defined as:

$$DFT_N = [\omega_N^{ik}], \omega_N = e^{\frac{-2\pi j}{N}}, j = \sqrt{-1}$$

Fourier transform matrix with multiplication by twiddle factors is defined as:

$$SDFT_N(\alpha) = T_N(\alpha) DFT_N$$

where $T_N(\alpha)$ is a diagonal matrix of twiddle factors with $\omega_N^{\alpha k}$, k=0, 1, . . . , N−1 elements on the diagonal.

A special case of the Kronecker product with identity matrix is defined as:

$$SDFT_N\left(\frac{i}{M}\right) \otimes_i I_M$$

where in the resulting matrix i is defined by an identity matrix element index $$SDFT_N\left(\frac{i}{M}\right) \otimes_i I_M = \left[T_N\left(\frac{i}{M}\right) \otimes_i I_M\right][DFT_N \otimes I_M]$$

where $$T_N\left(\frac{i}{M}\right) \otimes_i I_M$$

is a diagonal matrix of twiddle factors with elements $$\omega_N^{\lfloor \frac{k}{M} \rfloor (k \bmod M)},$$

k=0, 1, . . . , MN−1. Note that i corresponds to k mod M.

The following breakdown rules are utilized for factorization of DFT matrix into a sequence of sparse matrices.

$$DFT_{4m} = \{DFT_m \otimes I_4\}\{L_m^{4m} \cdot [SDFT_4(i/m) \otimes I_m]\}$$

$$DFT_{4m} \otimes I_n = \{DFT_m \otimes I_{4n}\}\{L_m^{4m} \cdot [SDFT_4(i/m) \otimes I_m]) \otimes I_n\}$$

The structure of sparse matrices of this kind allows efficient implementation of matrix vector product. In so doing, a DFT transform is divided into a plurality of FFT algorithm stages as shown in FIG. 5A.

Figure 5A:
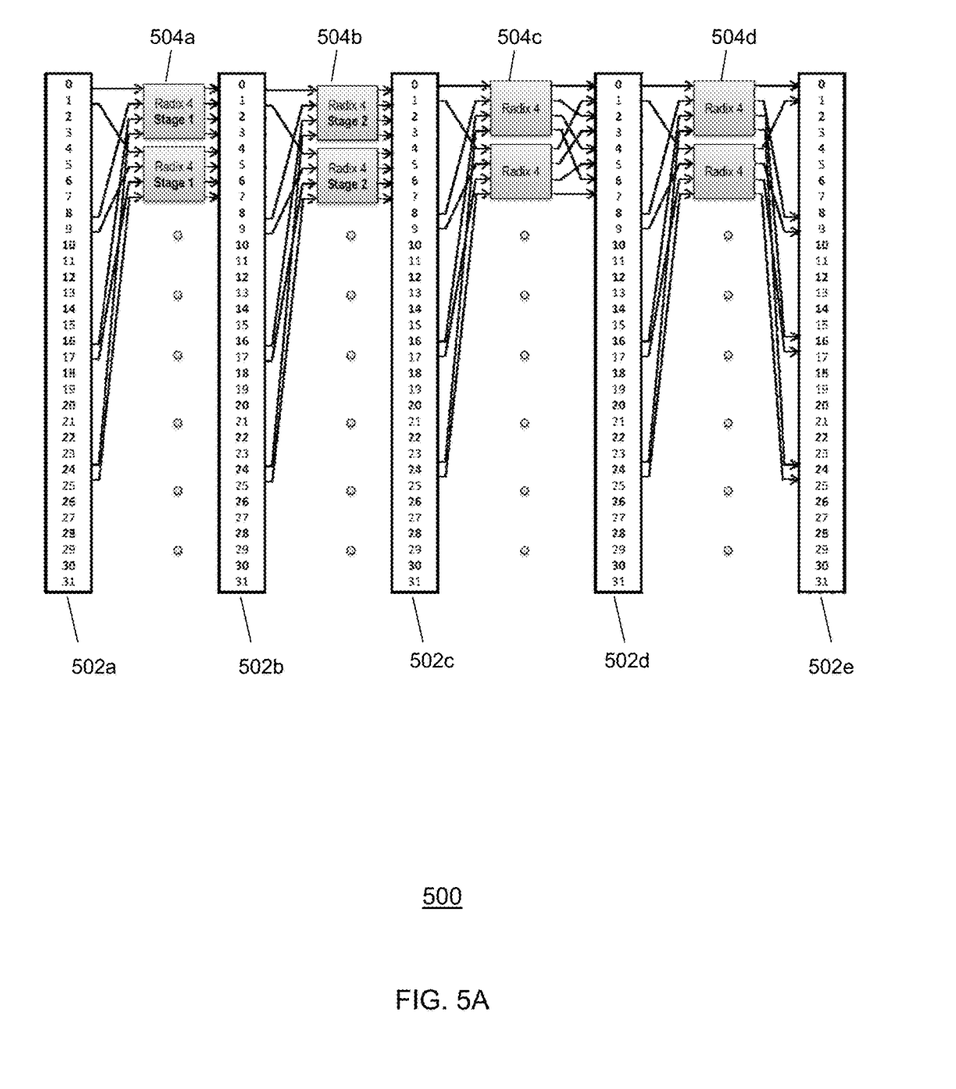
FIG. 5A is a data flow diagram of the FFT algorithm that implements a $DFT_{256}$ transform.
Figure 5B:
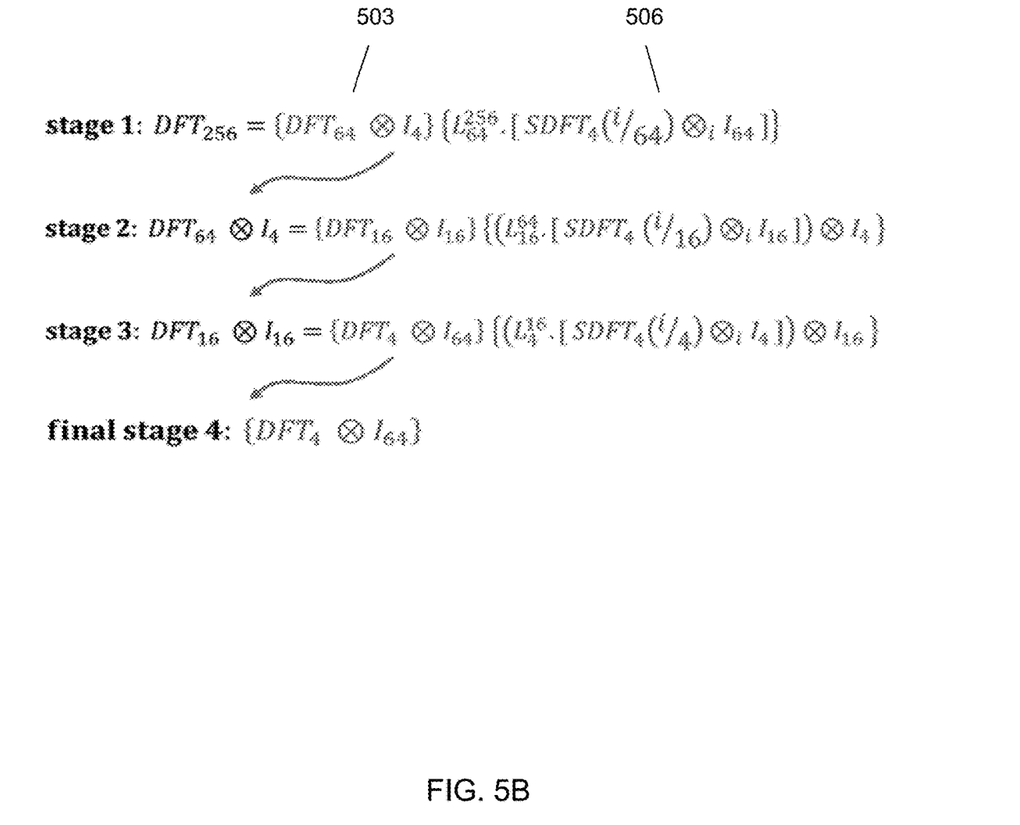
FIG. 5B illustrates a recursive rule being applied in four consecutive stages of the FFT-256 operation of FIG. 5A.

FIG. 5A is a data flow diagram of the FFT algorithm that implements a $DFT_{256}$ transform. 502a-502e are data buffers with vector elements, 502a is the input data buffer and 502e is the output data buffer. 504a-504d are radix 4 FFT stages. In this algorithm, the above recursive rules are applied in three consecutive steps. Each stage computes the right side 506 of the equation. The left side 503 is decimated in frequency to process a next stage.

In so doing, a large DFT matrix can be factorized into a number of sparse matrices oftentimes implemented by using the Radix 4 butterfly as the core computational model. However in implementing large FFT sizes in a fixed point architecture there is always the issue of potentially saturating the output from one stage to another. Hence there is typically a need for scaling and a resultant scaling at each stage.

Use of Special States to Facilitate Dynamic Scaling and Improve Efficiency

A plurality of states and operations within the scratch state memory facilitate dynamic scaling of when an FFT algorithm comprises a plurality of stages.

Figure 6:
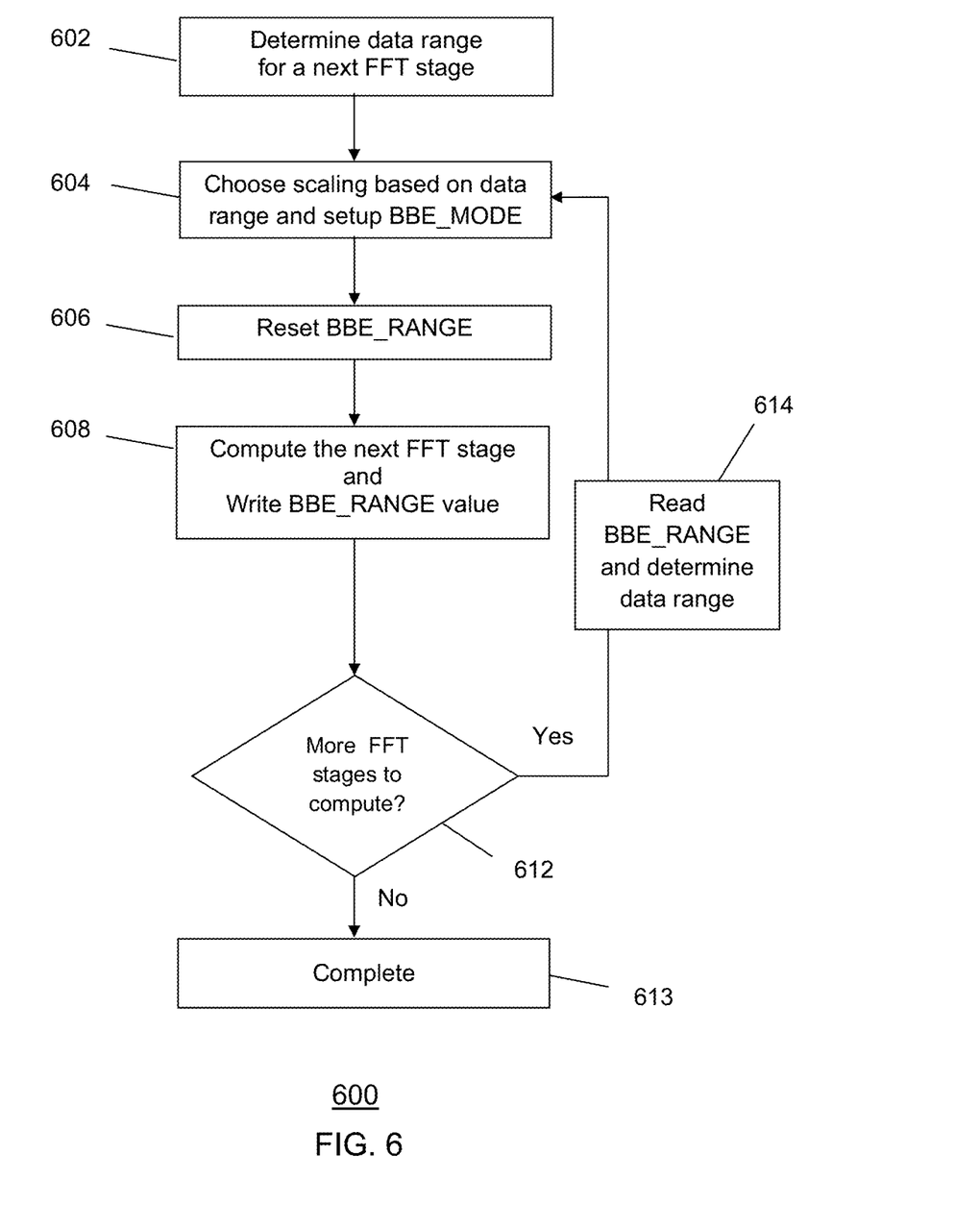
FIG. 6 is a flow chart that illustrates dynamic scaling in accordance with an embodiment.

FIG. 6 is a flow chart that illustrates dynamic scaling in accordance with an embodiment. In an embodiment a data range is determined in a present FFT stage for a next FFT stage, via step 602. Next a scaling factor is chosen based upon the data range, and the BBE_MODE register is updated accordingly, via step 604. Then the BBE_RANGE register is reset, via step 606. Thereafter, the next FFT stage is computed and a new BBE range value is written into the BBE_RANGE register, via step 608. Next it is determined if there are more FFT stages to compute, via step 612. If there are more FFT stages to compute, then the BBE_RANGE register is read and the new data range is determined, via step 614, and returned to step 604. The cycle continues until all of the FFT stages are computed and the FFT operations are complete, via step 613.

In an embodiment, the BBE_FFTRMODE is utilized to read from the scratch state memory 305 and BBE_FFTWMODE is utilized to write to the scratch state memory 305, BBE_RANGE (for example 4-bits) is used for dynamic range computation used to determine the scaling factor by accumulating normalized shift amounts for the data stored using a range sensing store operations (or operation BBE_RANGENX16). BBE_RRANGE is utilized to read the scratch state memory and BBE_WRANGE is utilized to write to the scratch state memory. In an embodiment, the BBE_RANGE register is set to a maximum scaling shift amount (NSA) it can hold, which in an embodiment is 4, before starting. As the range sensing stores execute, the BBE_RANGE register is updated and NSA may decrease. The BBE_RRANGE returns NSA for the data stored since the last BBE_WRANGE has issued. In an embodiment, a user can decide a scaling amount based on this value and the FFT stage in the FFT sequence.

FFT Special Interleaving Stores with Data Range Update

A significant amount of data shuffling is needed on a vector processor to compute data within an FFT algorithm in the natural order. To provide a more efficient data shuffling, instructions are provided which are described below to perform interleaving of elements of vector registers while storing them into main memory efficiently. In an embodiment, the instructions use an alignment register file and vector register file to avoid adding extra read ports on the vector register file. Operation BBE_SVINTLARNX16_XP interleaves complex elements from an input/output alignment register in the vector execution pipeline 202 (FIG. 2) and an input vector register before storing to the memory 102 (FIG. 1) at a location specified by an input/output address register in the scalar execution pipeline 212 (FIG. 2).

The Operation Stores to the Memory 102 a Lower-Half of an Interleaved Result. The input/output alignment register is then updated with the contents of an upper half of the interleaved result to be used in BBE_SALIGNVRNX16_XP operation.

The data in the input vector register is also used to update the BBE_RANGE register.

Finally the input/output address register is updated by adding an increment contained in a second input address register.

The interleaving pattern is controlled as shown in the following table.

| Selector | Interleaving Pattern |
| --- | --- |
| 0 | Interleave single complex 16-bit values from (in_vec, inout_valign) and output in that order |
| 1 | Interleave groups of 4 complex 16-bit values from (in_veo,inout_valign) and output in that order |

Thereafter second stage of storing with interleaving occurs. The operation BBE_SALIGNVRNX16_XP follows BBE_SVINTLARNX16_XP in a paired sequence to store the remaining contents of the interleaved result discussed above residing in the input/output alignment register at location specified by input/output address register.

The content of the input/output alignment register is stored to memory.

The input/output alignment register is then updated with the contents from the input vector register.

The data in the input vector register is again used to update the input/output BBE_RANGE special state.

Finally the input/output address register is updated by adding an increment contained in the second input address register.

Hence utilizing the above mechanism, data can be interleaved and stored more efficiently improving the overall performance of the processing system.

Conclusion

In a system and method in accordance with an embodiment, a small set of instructions can be used to implement an efficient FFT algorithm for any FFT problem size with radix operations using fixed point arithmetic. The instructions implement some parts of FFT algorithm related operations in hardware. In addition to the instruction set including additional vector operations, the instructions set also uses dynamic scaling to increase the accuracy of the result versus fixed scaling without requiring additional performance overhead.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer implemented method for Fast Fourier Transform (FFT) operations in a fixed point processor, the computer implemented method comprising:
   accessing input data for at least one set of add operations using a plurality of vector register files and a scratch state memory;
   calculating the at least one set of add operations within at least one FFT butterfly using the input data controlled by a mode register, wherein the at least one FFT butterfly comprises a plurality of FFT stages; and
   performing dynamic range sensing by determining a data range on an FFT stage of the plurality of FFT stages for a next FFT stage; and
   selecting scaling of data on the next FFT stage based on the data range.

2. The computer implemented method of claim 1, further comprising multiplying four inputs to the set of add operations by a complex number that includes real and imaginary constants to provide an output wherein the sign of the constant or conjugate is controlled by the mode register.

3. The computer implemented method of claim 2, wherein a right shift amount for the set of add operations is determined utilizing control bits from the mode register.

4. The computer implemented method of claim 1, which includes providing a scaling factor for each next FFT stage of the plurality of FFT stages based upon the data collected from a previous stage.

5. The computer implemented method of claim 1, in which the mode register sets control bits for scaling and additions.

6. The computer implemented method of claim 1 in which the instruction set includes a plurality of FFT helper operations and states.

7. The computer implemented method of claim 6, wherein plurality of FFT helper operations and states include any of machine state registers, load state registers, move state registers, move into align register, select operation, store with interleaving and range update, and range operations.

8. The computer implemented method of claim 1 further comprising: interleaving complex elements from an input/output alignment register in a vector execution pipeline of the fixed point processor and an input vector register before storing the complex elements to a main memory at a location specified by an input/output address register in a scalar execution pipeline of the fixed point processor.

9. A computer implemented method for Fast Fourier Transform (FFT) operations in a fixed point processor, the computer implemented method comprising:
   accessing an instruction set within a memory coupled to the fixed point processor; and
   calculating, using the instruction set and a mode register of the fixed point processors, a plurality of FFT operations with input data from a plurality of vector register files and a scratch state memory wherein the instruction set includes a plurality of FFT helper operations and states and a plurality of instructions for special variations of FFT operations to provide efficient processing of the FFT operations;
   wherein the plurality of FFT operations comprises a set of add operations; and
   wherein each add operation of the set of add operations comprise four inputs, wherein the four inputs are multiplied by a complex number of real and imaginary constants to provide an output wherein the sign of the constant or conjugate is controlled by the mode register.

10. The computer implemented method of claim 9, wherein the plurality of HT operations further comprise calculation of a right shift amount determined utilizing control bits from the mode register.

11. The computer implemented method of claim 9, further comprising:
   setting, by the mode register, control bits for scaling and additions.

12. The computer implemented method of claim 9, wherein the plurality of FFT helper operations and states include any of machine state registers, load state registers, move state registers, move into align register, select operation; store with interleaving and range update, and range operations.

13. The computer implemented method of claim 9, wherein the instruction set includes at least one instruction for interleaving complex elements from an input/output alignment register in a vector execution pipeline of the fixed point processor architecture and an input vector register before storing to main memory at a location specified by an input/output address register in a scalar execution pipeline of the fixed point processor architecture.

14. A fixed point processor architecture comprising:
   a memory;
   a data memory interface coupled to the memory;
   a plurality of vector registers files coupled to the data memory interface;
   a vector execution unit coupled to the plurality of vector register files; and
   a scratch state memory coupled to the data memory interface, the vector execution unit and the plurality of register files, the scratch state memory further comprising a mode register and a range register;
   wherein the vector execution unit is configured by an instruction set to calculate at least one set of add operations as controlled by the mode register, wherein the plurality of vector register files and the scratch state memory provide input data to the at least one set of add operations.

* * * * *